(12) United States Patent
Liang et al.

(10) Patent No.: US 11,184,744 B2
(45) Date of Patent: Nov. 23, 2021

(54) APPARATUS, SYSTEMS AND METHODS FOR ENHANCING SHORT MESSAGE SERVICE OVER INTERNET PROTOCOL

(71) Applicant: APPLE INC., Cupertino, CA (US)

(72) Inventors: Huarui Liang, Beijing (CN); Zhiwei Wang, Beijing (CN); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 56 days.

(21) Appl. No.: 15/755,397

(22) PCT Filed: Aug. 28, 2015

(86) PCT No.: PCT/CN2015/088363
§ 371 (c)(1),
(2) Date: Feb. 26, 2018

(87) PCT Pub. No.: WO2017/035692
PCT Pub. Date: Mar. 9, 2017

(65) Prior Publication Data
US 2018/0270626 A1      Sep. 20, 2018

(51) Int. Cl.
*H04W 4/14*    (2009.01)
*H04W 8/06*    (2009.01)
*H04L 29/06*   (2006.01)
*H04W 8/18*    (2009.01)
*H04W 84/04*   (2009.01)

(52) U.S. Cl.
CPC .......... *H04W 4/14* (2013.01); *H04L 65/1016* (2013.01); *H04W 8/06* (2013.01); *H04W 8/18* (2013.01); *H04W 84/042* (2013.01)

(58) Field of Classification Search
CPC .............................. H04W 76/10; H04W 8/04
USPC ... 455/414.1, 426.1, 466, 404.1, 558, 432.1, 455/404.2, 433; 370/310, 252, 331, 328, 370/466, 342, 230; 398/25
See application file for complete search history.

(56) References Cited

U.S. PATENT DOCUMENTS

| | | | |
|---|---|---|---|
| 2008/0090597 A1* | 4/2008 | Celik | H04M 1/72552 455/466 |
| 2013/0329638 A1* | 12/2013 | Ren | H04W 60/005 370/328 |
| 2014/0128113 A1* | 5/2014 | Zisimopoulos | H04W 4/70 455/466 |
| 2014/0133399 A1* | 5/2014 | Kim | H04W 4/14 370/328 |

(Continued)

*Primary Examiner* — Kiet M Doan
(74) *Attorney, Agent, or Firm* — Fay Kaplun & Marcin, LLP (57) ABSTRACT

Described herein are apparatuses, systems and methods for enhancing short message service ("SMS") over Internet protocol ("IP"). The methods including at, a user equipment ("UE") connected to a network, receiving an indication from the network, wherein the indication identifies whether the network supports an SMS over IP session, when the indication identifies that the network supports the SMS over IP session, registering the UE for voice communication and the SMS over IP session with the network, and when the indication identifies that the network does not support the SMS over IP session, registering the UE for voice communication without the SMS over IP session with the network.

20 Claims, 5 Drawing Sheets

(56) References Cited

U.S. PATENT DOCUMENTS

| | | | |
|---|---|---|---|
| 2015/0045074 A1* | 2/2015 | Wong | H04W 4/14 |
| | | | 455/466 |
| 2015/0080035 A1* | 3/2015 | Tanaka | H04W 4/14 |
| | | | 455/466 |
| 2015/0358853 A1* | 12/2015 | Kiss | H04W 28/0263 |
| | | | 370/230 |
| 2016/0278096 A1* | 9/2016 | Watfa | H04W 4/14 |
| 2016/0278132 A1* | 9/2016 | Baek | H04W 68/02 |

* cited by examiner

Fig. 1

APPARATUS, SYSTEMS AND METHODS FOR ENHANCING SHORT MESSAGE SERVICE OVER INTERNET PROTOCOL

BACKGROUND

In wireless telecommunication networks, Long-Term Evolution, or "LTE," is defined as a standard for wireless communication of high-speed data for mobile phones and data terminals. The LTE standard is developed by the Third Generation Partnership Project ("3GPP") and the Institute of Electrical and Electronics Engineers ("IEEE"). An exemplary LTE access network is a wireless network of base stations, or evolved NodeBs ("eNBs"), that are interconnected without a centralized intelligent controller. The LTE standard has been described as a natural upgrade path for carriers using prior generation networks or "legacy" protocols, such as Global System for Mobile Communications/Universal Mobile Telecommunications System ("GSM/UMTS") protocols and Code Division Multiple Access ("CDMA") 2000 1× (e.g., 1×RTT or simply "1×") wireless communication protocols. Each of these different types of networks and protocols may be termed radio access technologies ("RATs").

Through the usage of an all-Internet Protocol ("IP") network, the LTE standard supports only packet switching ("PS") data transmissions. Similar to many other protocols, an IP network breaks data into blocks and wraps the blocks into structures called packets. Each packet contains, along with the data load, information about the IP address of the source and the destination nodes, sequence numbers, control information, etc. In a circuit switched ("CS") network, the communication channel remains open and in use throughout the duration of the call and the call data is transmitted all at once without being broken into blocks.

Since voice calls in GSM, UMTS and CDMA2000 utilize circuit switched data transmissions, carriers adopting the LTE standard need to re-engineer their voice call network. Various approaches include Voice over LTE ("VoLTE"), circuit-switched fallback ("CSFB"), and simultaneous voice and LTE ("SVLTE"). For instance, the VoLTE approach uses an IP multimedia subsystem ("IMS") network having specific profiles for control and media planes of voice service on LTE. Accordingly, VoLTE communications result in the voice service being delivered as data flows within the LTE data bearer. Thus, there is no requirement for the legacy circuit-switched voice network to be maintained. Furthermore, VoLTE communications has up to three times more voice and data capacity than UMTS networks and up to six times more than GSM networks. Using the CSFB approach, LTE provides data services while a received or initiated voice call falls back to the circuit-switched network. Under the SVLTE approach, the user equipment ("UE") works simultaneously in both the LTE and circuit switched modes, wherein the LTE mode provides data services and the circuit switched mode provides the voice service.

SUMMARY

Described herein are apparatuses, systems and methods for enhancing short message service ("SMS") over Internet protocol ("IP"). The methods including at, a user equipment ("UE") connected to a network, receiving an indication from the network, wherein the indication identifies whether the network supports an SMS over IP session, when the indication identifies that the network supports the SMS over IP session, registering the UE for voice communication and the SMS over IP session with the network, and when the indication identifies that the network does not support the SMS over IP session, registering the UE for voice communication without the SMS over IP session with the network.

Further described herein is a UE comprising a transceiver configured to enable the UE to establish a connection to a network and a processor configured to receive an indication from the network, wherein the indication identifies whether the network supports an SMS over IP session, wherein when the indication identifies that the network supports the SMS over IP session, register the UE for voice communication and the SMS over IP session with the network, and wherein when the indication identifies that the network does not support the SMS over IP session, register the UE for voice communication without the SMS over IP session with the network.

Further described herein is a method comprising, at a network component of a network, identifying capabilities of the network, setting an indication based on the capabilities of the network, wherein the indication indicates whether the network supports an SMS over IP session, and transmitting the indication to a UE.

DETAILED DESCRIPTION

The exemplary embodiments may be further understood with reference to the following description and the appended drawings, wherein like elements are referred to with the same reference numerals. The exemplary embodiments describe an apparatus, system and method for enhancing SMS over IP through the introduction of a unique network capability indicator. In the exemplary embodiments, a mobile device will be described as user equipment ("UE") and the base station will be described as an evolved Node B ("eNB") base station, which is generally known as being a base station associated with an LTE radio access network ("LTE-RAN"). However, it will be understood by those skilled in the art that UEs and base stations operating in accordance with other network standards may also implement the exemplary embodiments in accordance with the functionalities and principles described herein.

The LTE-RAN may be a portion of the cellular networks deployed by cellular providers or operators (e.g., Verizon, AT&T, Sprint, T-Mobile, etc.). These networks may include, for example, base client stations (Node Bs, eNodeBs, HeNBs, etc.) that are configured to send and receive traffic from UEs that are equipped with an appropriate cellular chip set. In addition to LTE-RAN, the operators may also include legacy RANs that are generally labeled as 2G and/or 3G networks and may utilize circuit switched voice calls and packet switched data operations. Those skilled in the art will understand that the cellular providers may also deploy other types of networks, including further evolutions of the cellular standards, within their cellular networks.

As will be described in greater detail below, operators may deploy an IP Multimedia Subsystem ("IMS"). The IMS may be generally described as an architecture for delivering multimedia services to the UE using the IP protocol. In the context of the LTE-RAN, the IMS may provide an exemplary UE with voice capabilities (e.g., VoLTE) as well as Short Messaging Services ("SMS") capabilities. In the context of legacy RANs, the IMS may also provide the UE with SMS services.

In order to use the services provided by the IMS, the UE needs to register with the IMS. For instance, registration with the IMS may be achieved when the UE reports its device capabilities to its network. The reported device capabilities may include the ability to support VoLTE as well as SMS over IP. In response to the UE report, the network may provide the UE with the network capabilities. Accordingly, the network capability of supporting VoLTE by IMS voice over packet switch ("IMSvoPS") may be reported to the UE through a non-access stratum ("NAS") message. The network capability of supporting SMS over IP may be reported to the UE during the IMS registration procedure, such as via a tag of "SMSoverIP."

While an exemplary network operator may deploy an IMS network for supporting both VoLTE and SMS over IP capabilities, other operators may not utilize both capabilities. For instance, an operator may deploy a partial LTE network supporting VoLTE and a partial network only supporting SMS over IP. Alternatively, another operator may support VoLTE capabilities without supporting SMS over IP capabilities. When an exemplary network does not support SMS over IP, the UE may still perform an IMS registration procedure. This extraneous registration may have a detrimental impact on the service provided to the UE, and thus detract from the user experience. For instance, the IMS registration process may introduce delays in the SMS, waste the signaling load of the UE, waste of network resources, etc.

The exemplary systems and methods described herein provide enhanced solutions to accommodate various use cases of different operators. As will be described in detail below, these enhanced solutions may introduce a new and unique capability indicator, namely an IMSvoSMS indicator, for use by the UE. Accordingly, the network may decide an indicator value (e.g., "0" or "1") for the IMSvoSMS indicator based on network capabilities. For instance, an IMSvoSMS indicator value of "1" may indicate to the UE that the network is capable of supporting SMS over IP. Alternatively, an IMSvoSMS indicator value of "0" may indicate to the UE that the network is not capable of supporting SMS over IP. Therefore, as long as the UE receives an IMSvoSMS indicator of 1 from the network (e.g., from the eNB), the UE may register with the IMS for both VoLTE and SMS over IP. For an indicator value of "0", the UE may not perform IMS registration for SMS over IP and may utilize an alternative method such as SMS over PS for such services.

Figure 1:
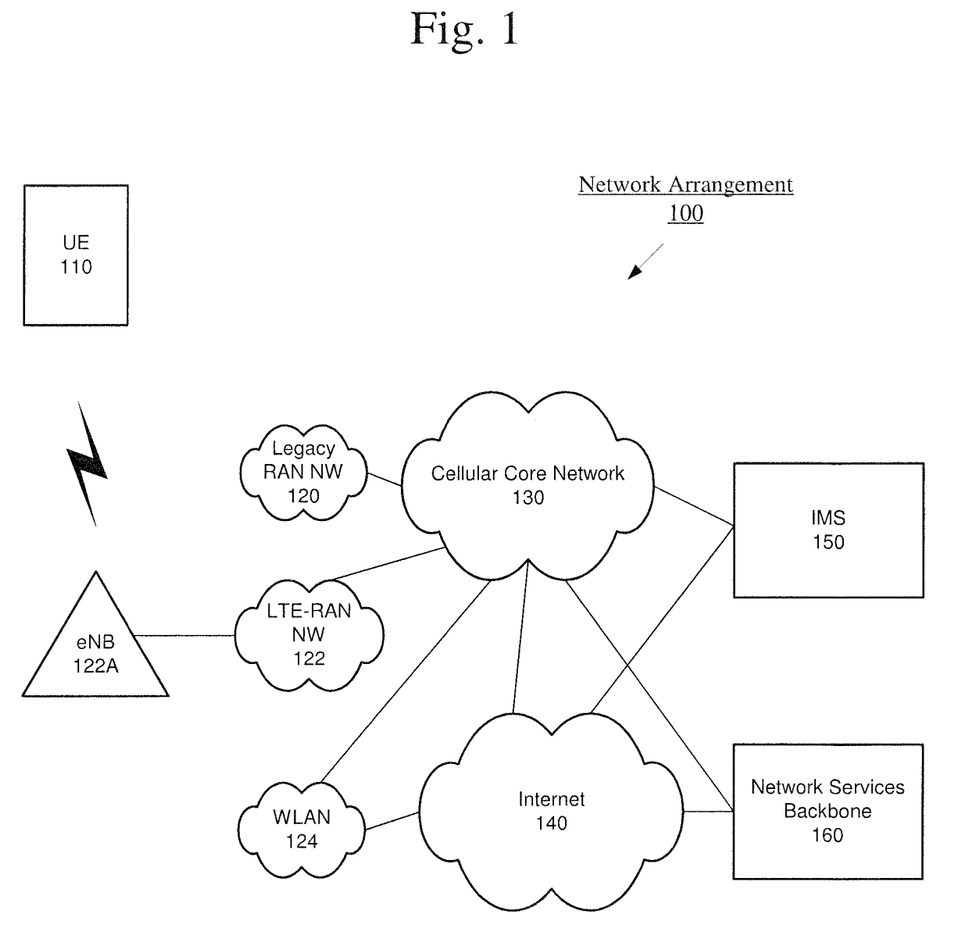
FIG. 1 shows an exemplary network arrangement for enhancing SMS over IP, according to various embodiments described herein.

FIG. 1 shows an exemplary network arrangement 100 according to various embodiments described herein. The exemplary network arrangement 100 includes the UE 110. Those skilled in the art will understand that the UE 110 may be any type of electronic component that is configured to communicate via a network, e.g., mobile phones, tablet computers, desktop computers, smartphones, phablets, embedded devices, wearables, etc. The UE 110 may be configured to perform cellular and/or WiFi functionalities and may include processors, memory arrangements, displays, transceivers, etc. It should also be understood that an actual network arrangement may include any number of UEs being used by any number of users and being associated with any number of these users where the user may be associated with one or more UEs. That is, the example of one UE 110 is only provided for illustrative purposes.

The UE 110 may be configured to communicate directly with one or more networks. In this example, the networks with which the UE 110 may communicate are a legacy radio access network ("RAN") 120, a LTE RAN (LTE-RAN) 122, and a wireless local area network ("WLAN") 124. More specifically, the legacy RAN 120 may be a circuit switched network, e.g., GSM, UMTS, CDMA, 1×RTT, 1×, etc. In this example, each of the networks 120-124 is a wireless network with which the UE 110 may communicate wirelessly. However, it should be understood that the UE 110 may also communicate with other types of networks and may also communicate using a wired connection.

With regards to the exemplary embodiments, the UE 110 may establish a connection with the LTE-RAN 122 to, among other functionalities, perform data transfers, voice calls and exchange SMS messages with the LTE network. In another example, the UE 110 may communicate with the legacy RAN 120 to perform some or all of the same functionalities, depending, for example, on the availability of a connection between the UE 110 and the LTE-RAN 122.

The network arrangement 100 also includes a cellular core network 130 and the Internet 140. The cellular core network 130, the legacy RAN 120, and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

As described above, the network arrangement 100 also includes an IMS 150 to provide the UE 110 with voice capabilities (e.g., VoLTE) and messaging capabilities (e.g., SMS). The UE 110, in order to use the services provided by the IMS 150, needs to register with the IMS 150. The IMS 150 may include a variety of components to accomplish these tasks. For example, a typical IMS 150 includes a Home Subscriber Server ("HSS") that stores subscription information for a user of the UE 110. This subscription information is used to provide the correct multimedia services to the user. The IMS 150 may communicate with the cellular core network 130 and the Internet 140 to provide the multimedia services to the UE 110. The IMS 150 is shown in close proximity to the cellular core network 130 because the cellular provider typically implements the functionality of the IMS 150. However, it is not necessary for this to be the case such as when the IMS 150 is provided by another party. Thus, the network arrangement 100 allows the UE 110 to perform functionalities generally associated with computers and cellular networks.

The network arrangement 100 may also include a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks. The network services backbone 160 may interact with the UE 110 and/or the networks 120, 122, 124, 130, 140 to provide these extended functionalities.

The network services backbone 160 may be provided by any entity or a set of entities. In one example, the network services backbone 160 is provided by the supplier of the UE 110. In another example, the network services backbone 160 is provided by the cellular network provider. In still a further example, the network services backbone 160 is provided by a third party unrelated to the cellular network provider or the supplier of the UE 110.

The exemplary embodiments relate to the UE 110 connecting to LTE-RAN 122 via an eNB 122A. Initially, the UE 110 may establish a connection to the LTE-RAN 122. Those skilled in the art will understand that any association procedure may be performed for the UE 110 to connect to the LTE-RAN 122. For example, as discussed above, the LTE-RAN 122 may be associated with a particular cellular provider where the UE 110 and/or the user thereof has a contract and credential information (e.g., stored on a SIM card). Upon detecting the presence of the LTE-RAN 122, the UE 110 may transmit the corresponding credential information to associate with the LTE-RAN 122. More specifically, the UE 110 may associate with a specific access point (e.g., the eNB 122A of the LTE-RAN 122).

As described above, when the UE 110 is associated with the LTE-RAN 122, the UE 110 may register with the IMS 150 to receive certain services such as VoLTE and SMS services. As part of registering with the IMS 150, the UE 110 will configure its internal stack to an LTE protocol stack. In addition, since the services will be provided using the IP based network, the UE 110 may also receive an IP address.

Figure 2:
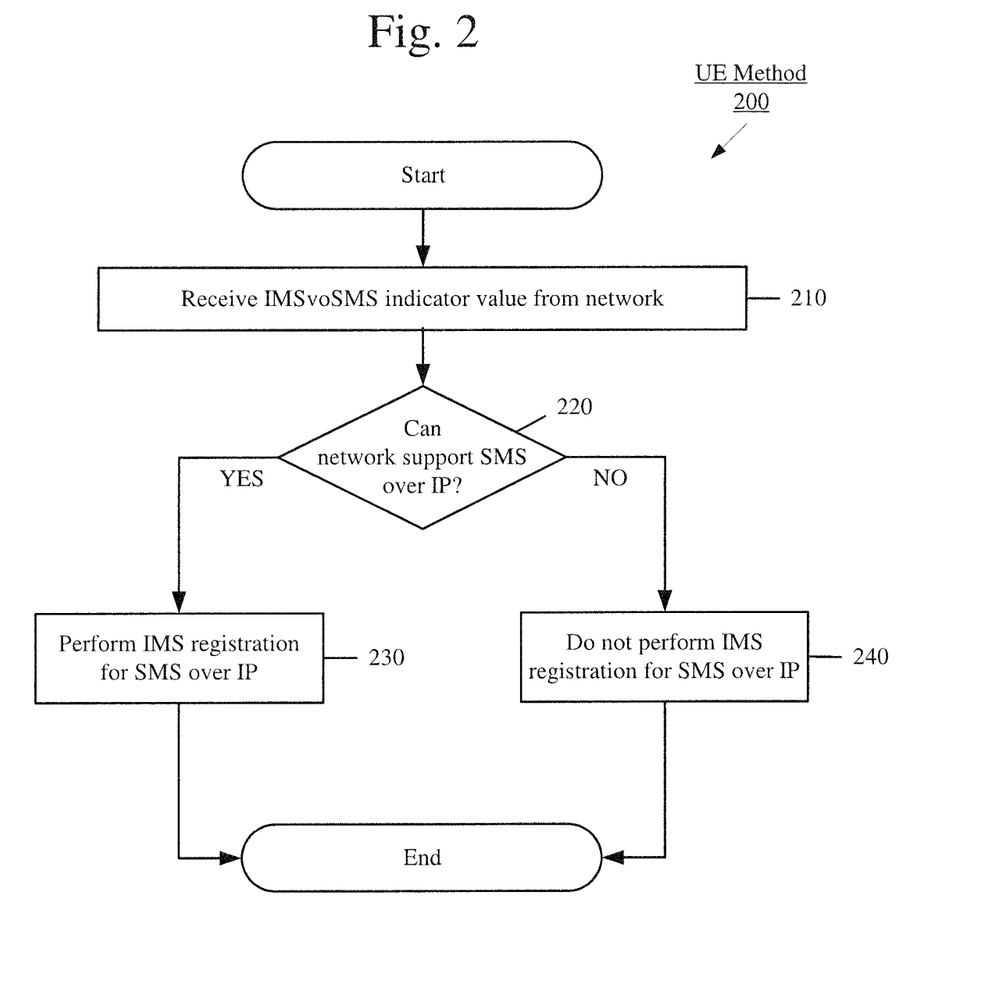
FIG. 2 shows an exemplary method for enhancing SMS over IP at a mobile device, such as the UE, in a wireless network, such as the LTE-RAN, according to various embodiments described herein.

FIG. 2 shows an exemplary method 200 for enhancing SMS over IP at a mobile device, such as the UE 110, in a wireless network, such as the LTE-RAN 122, according to various embodiments described herein. The method 200 will be described with reference to the network arrangement 100 of FIG. 1. It may also be considered that the exemplary eNB 122A may be aware of the network capabilities and may implement the usage of the IMSvoSMS indicator of the UE 110.

In 210, the UE 110 may receive the IMSvoSMS indicator from the network, such as the LTE-RAN 122. For example, in the LTE-RAN 122, the UE 110 may receive the IMSvoSMS indicator from a mobility management entity ("MME") of the network. The MME may be a control-node for the LTE-RAN 122 that performs paging and tagging operations for an idle mode of the UE 110. More specifically, the MME may perform operations related to bearer activation and/or deactivation. The MME may also select a serving gateway (SGW) at the initial attach with the IMS 150. According to an exemplary embodiment, the network may provide the indication based on any number of factors, such as, but not limited to a local policy of the network, the capabilities of the home public land mobile network ("HPLMN"), SMS over IP capabilities, UE capabilities, extent of coverage provided by Universal Terrestrial Radio Access Network ("UTRAN") and Evolved UTRAN ("E-UTRAN").

As described above, this exemplary embodiment is describing exemplary operations of an LTE network, and describing the exemplary components of an LTE network that may be used to perform the functionalities associated with the exemplary embodiments. However, those skilled in the art will understand that the exemplary embodiments may also be applied to enhancing SMS over IP of a mobile device within any wireless communication systems that may support SMS over IP. For instance, the exemplary embodiments may be applied within a 3G network such as a Universal Mobile Telecommunications System ("UMTS") network. In contrast to using the MME of an LTE network, a UMTS network may indicate the SMS over IP capabilities to a UE through any number of methods, such as via a routing area update ("RAU") by a serving general packet radio service ("GPRS") support node ("SGSN") entity on the core network side (e.g., Node B in UTRAN).

As described above, the network may use the IMSvoSMS indicator to indicate to the UE 110 whether the UE 110 may expect a successful SMS over IP session with a bearer that supports SMS. Accordingly, the UE 110 may receive the indication from the MME during an attach procedure or tracking area update ("TAU") procedures if SMS over IP is supported by the network. As described above, if the network is a UMTS network, the UE may receive the indication from the SGSN during an attach procedure or RAU procedure. It should be noted that the indication is not limited to being transmitted by the MME or SGSN. Any component within the core network 130 may transmit the indication to the UE 110. It should also be noted that the exemplary embodiments are not limited to LTE or UMTS networks, but may be applied to any network that may support SMS over IP.

In 220, the UE 110 determines if the network is capable of supporting SMS over IP based on the IMSvoSMS indicator. Specifically, the UE 110 may use the indicator value to determine the network capabilities. As noted above, for instance, the indicator value may be "1" if the network can support SMS over IP and may be "0" if the network cannot support SMS over IP.

If the UE 110 determines that the network is able to support SMS over IP, the UE 110 may initiate IMS registration for SMS over IP in 230. The UE 110 may then perform the VoLTE and SMS functionalities via the IMS 150.

If the UE 110 determines that the network is unable to support SMS in IP, the UE 110 may not initiate IMS registration for SMS over IP in 240. In other words, the UE 110 does not need to perform the signaling associated with registering for SMS over IP with the IMS 150. This results in power savings for the UE 110 due to the reduced signaling and also results in an improved user experience since the UE 110 may initiate SMS via PS operations immediately, without the delay associated with unsuccessful registration with the IMS 150 for SMS over IP. The UE 110 may still register for voice communication (e.g., VoLTE) with the IMS 150 without registering for SMS over IP with the IMS 150.

Figure 3:
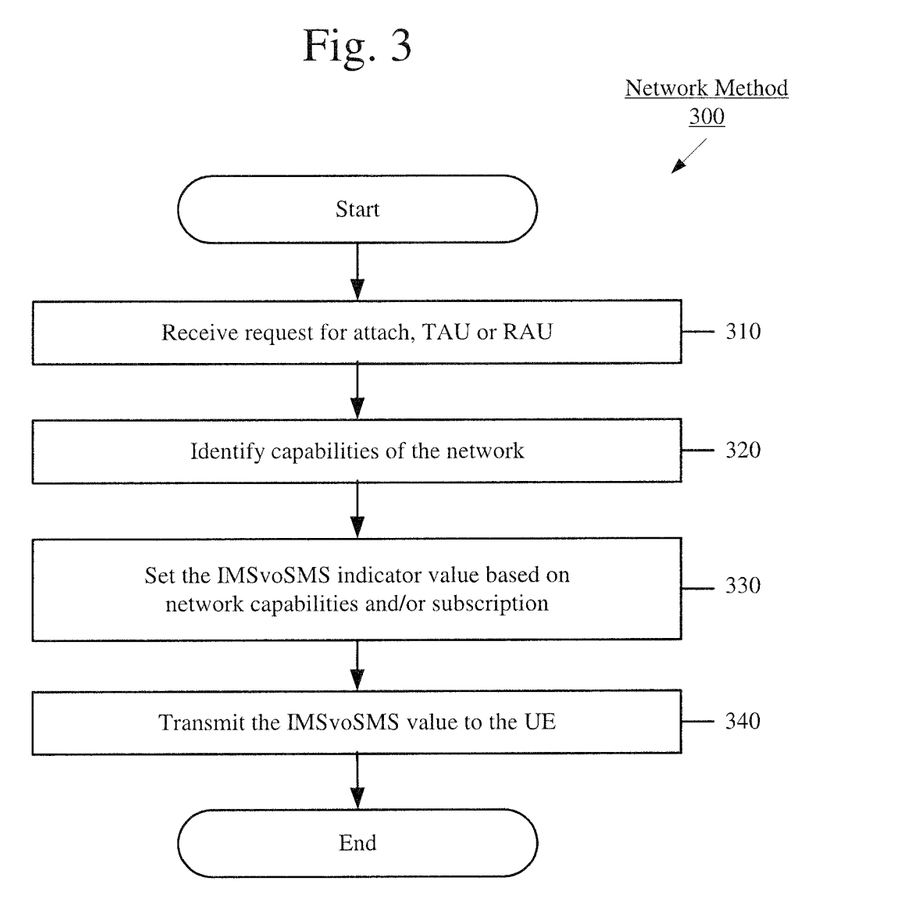
FIG. 3 shows a further exemplary method for enhancing SMS over IP at a mobile device, such as the UE, in a wireless network, such as the LTE-RAN, according to various embodiments described herein.

FIG. 3 shows a further exemplary method 300 for enhancing SMS over IP at a mobile device, such as the UE 110, in a wireless network, such as the LTE-RAN 122, according to various embodiments described herein. The method 300 will be described with reference to the network arrangement 100 of FIG. 1.

In 310, the MME may receive a request for an attach procedure or a TAU procedure from the UE 110. In addition, the MME may receive subscription information from the HSS. As noted above, the HSS may store subscription information for a user of the UE 110, wherein the subscription information is used to provide the correct multimedia services to the user. The IMS 150 may communicate with the cellular core network 130 and the Internet 140 to provide the multimedia services to the UE 110.

In 320, the MME identifies the capabilities of the LTE-RAN 122. More specifically, the MME determines whether the LTE-RAN 122 is able to support SMS over IP to the UE 110. As noted above, the capabilities of the LTE-RAN 122 may be identified based on any number of factors, such as HPLMN, local policies, etc. The MME may thus use the indicator value to indicate whether or not an SMS over IP session is supported in the tracking areas ("TAs") registered for the UE. Furthermore, the MME may also note the time of the last radio contact with the UE 110 as well as the current RAT type.

Upon identifying the capabilities of the LTE-RAN 122, in 330, the MME may set the IMSvoSMS indicator value accordingly. In addition, or alternatively, the MME may set the IMSvoSMS indicator value based on the subscription information received from the HSS.

In 340, the MME may transmit the IMSvoSMS indicator value to the UE 110. Therefore, the UE 110 may expect network capability of supporting SMS over IP after attach and/or TAU procedures. Furthermore, the UE 110 will not need to further perform IMS registration if an SMS over IP session is not supported in the network side.

Figure 4:
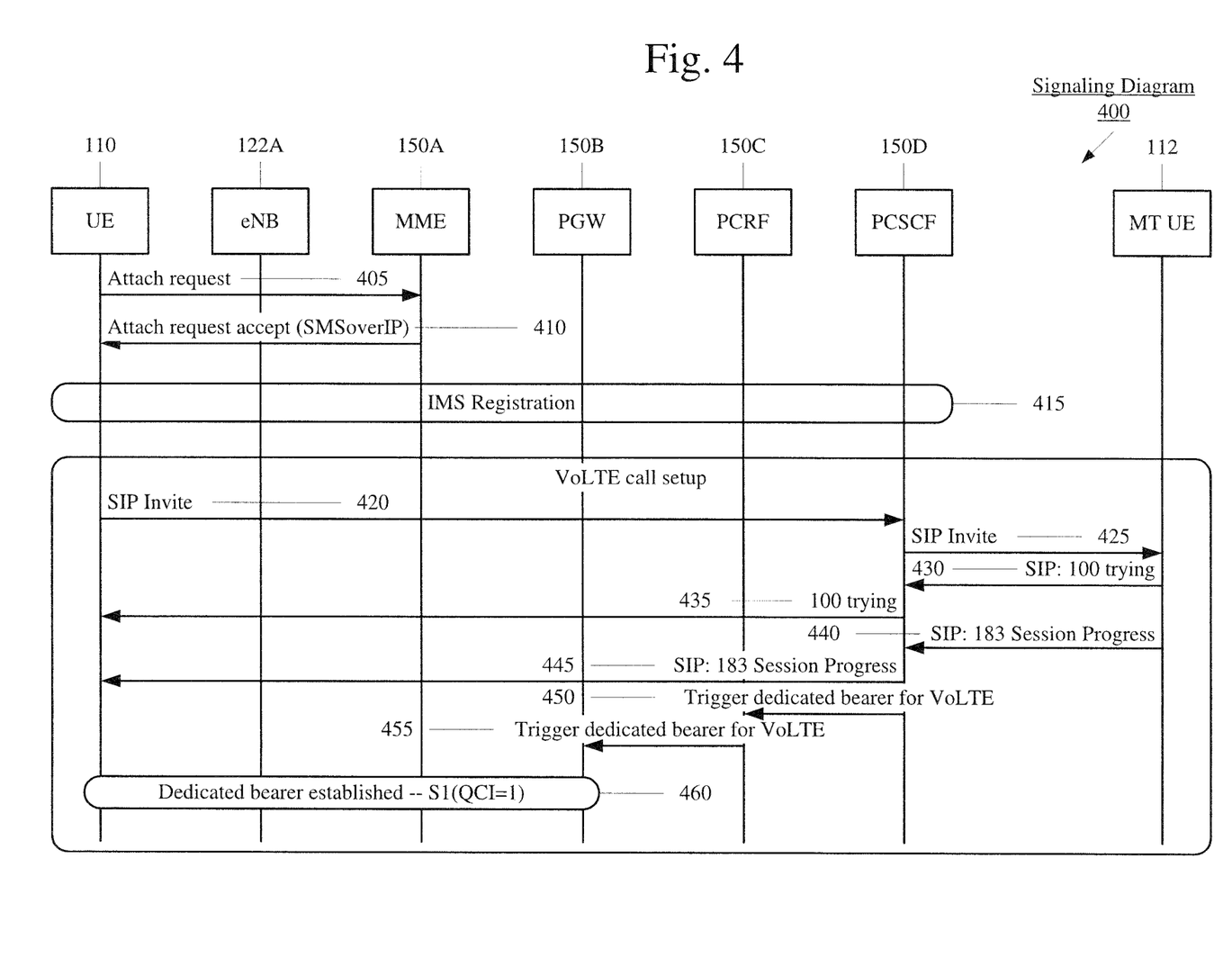
FIG. 4 shows an exemplary signaling diagram for enhancing SMS over IP at a mobile device, such as the UE, in a wireless network, such as the LTE-RAN, according to various embodiments described herein.

FIG. 4 shows an exemplary signaling diagram 400 for enhancing SMS over IP at the UE 100 in the LTE-RAN 122 according to various embodiments described herein. The signaling diagram 400 illustrates a VoLTE IMS registration procedure. The signaling diagram 400 includes substantially similar operations as described above.

Initially, the UE 110 may establish a connection with an eNB 122A of the LTE-RAN 122 as well as the IMS 150 using an attachment procedure. Specifically, at 405, the UE 110 may detect the presence of the LTE-RAN 122 and transmit an attach request to the MME 150A. At 410, the MME 150A may transmit to the UE 110 an attach request accept including the SMS over IP information (e.g., IMSovSMS indicator value). Upon performing an association procedure, the UE 110 may establish a connection to the LTE-RAN 122 via the eNB 122A. Furthermore, upon establishing the connection the LTE-RAN 122, the eNB 122A may assign a default bearer for the UE 110 and establish the default bearer. The attachment procedure 305 may therefore also be utilized with components of the IMS 150 such as a MME 150A and a PGW 150B.

The UE 110 may then perform an IMS registration 415 upon connecting to the IMS 150 based on the SMS over IP information received at 410. As detailed above, the indicator value of the SMS over IP information may be based on the capabilities of the network. More specifically, the indication may indicate whether the network supports an SMS over IP session for the UE 110. Furthermore, the indication may be in the form of an indication value, such a "1" for supporting SMS over IP and "0" for not supporting SMS over IP. Thus, upon receiving the indicator value from the MME 150A, the UE 110 may determine the capabilities of the network and register accordingly. When the indication identifies that the network supports the SMS over IP session (e.g., IMSvoSMS=1), the UE 110 may register with the IMS 150 for voice communication and the SMS over IP session with the network. When the indication identifies that the network does not support the SMS over IP session (e.g., IMSvoSMS=0), the UE 110 may not perform IMS registration for an SMS over IP session with the network. The UE 110 may still register for voice communication (e.g., VoLTE) with the IMS 150 without registering for SMS over IP with the IMS 150.

The IMS registration 415 may further be utilized with components of the IMS 150 such as packet data network ("PDN") gateway ("PGW") 150B, a policy and charging rules function ("PCRF") 150C and a proxy call session control function ("P-CSCF") 150D. It should be noted that a mobile terminated ("MT") UE 112 may perform substantially similar operations (not shown) to connect to the LTE-RAN 122 and the IMS 150.

With the UE 110 connected to the LTE-RAN 122 and the IMS 150 and the IMS registration procedure completed to indicate that the UE 110 is configured to perform the VoLTE call functionality, the UE 110 may initiate a VoLTE call setup procedure. Accordingly, a Session Initiation Protocol ("SIP") signaling may be performed in which the SIP invite 420 may be transmitted from the UE 110 to the P-CSCF 150D; the SIP invite 425 may be transmitted from the P-CSCF to the MT UE 112; the SIP: 100 trying 430 may be transmitted from the MT UE 112 to the P-CSCF 150D, the 100 trying signal 435 may be transmitted from the P-CSCF 150D to the UE 110; the SIP: 183 session progress 440 may be transmitted from the MT UE 112 to the P-CSCF 150D; and the SIP: 183 session progress 445 may be transmitted from the P-CSCF 150D to the UE 110. While this SIP signaling is being performed, the signal to trigger the dedicated bearer for VoLTE 450 may be transmitted from the P-CSCF 150D to the PCRF 150C; and the signal to trigger the dedicated bearer for VoLTE 455 may be transmitted from the PCRF 150C to the PGW 150B. Accordingly, the dedicated bearer 460 is established and the VoLTE call may be performed.

It is noted that although the signaling diagram 400 appears to show such that the dedicated bearer is triggered after the SIP: 183 session progress signaling, it is noted that this is not representative of the operations of the exemplary embodiments. In contrast, the SIP signaling including the invite, the 100 trying, and the 183 session progress may be performing in the order shown, but the triggering of the dedicated bearer may be performed in parallel to these SIP signaling and is not performed after the SIP signaling.

Figure 5:
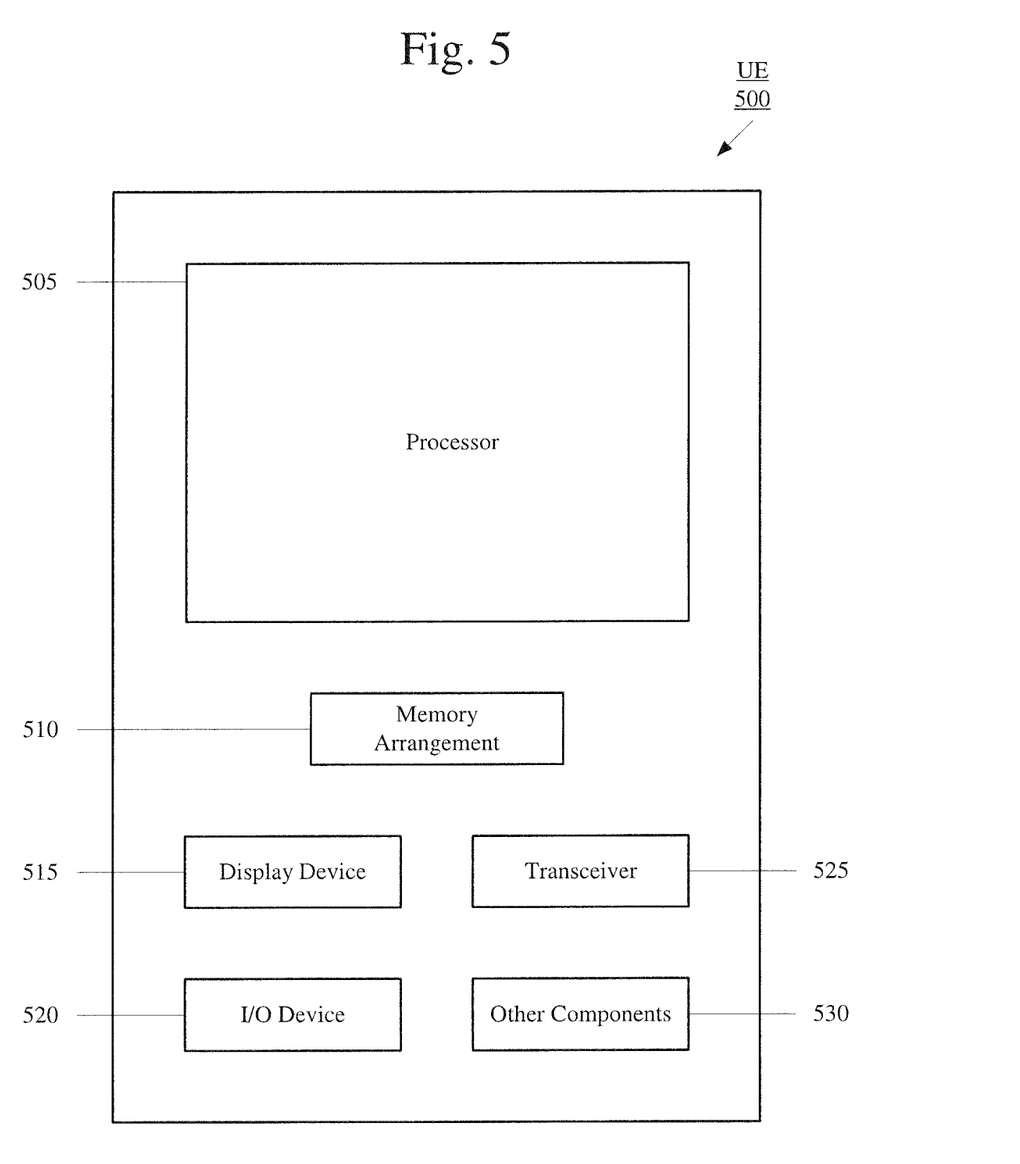
FIG. 5 shows an exemplary UE according to various embodiments described herein.

FIG. 5 shows an exemplary UE 500 according to various embodiments described herein. The UE 500 may represent any electronic device that is configured to perform wireless functionalities and may be representative of the UE 110 depicted in FIG. 1. Accordingly, the UE 500 may be a portable device such as a smartphone, a tablet, a phablet, a laptop, a wearable, etc. In another example, the UE 500 may be a client stationary device such as a desktop terminal. The UE 500 may be configured to perform cellular and/or WiFi functionalities. The UE 500 may include a processor 505, a memory arrangement 510, a display device 515, an input/output (I/O) device 520, a transceiver 525, and other components 530. The other components 530 may include, for example, an audio input device, an audio output device, a battery, a data acquisition device, ports to electrically connect the UE 500 to other electronic devices, etc.

The processor 505 may be configured to execute a plurality of applications of the UE 500. It should be noted that the above noted applications each being an application (e.g., a program) executed by the processor 505 is only exemplary. The functionality associated with the applications may also be represented as a separate incorporated component of the UE 500 or may be a modular component coupled to the UE 500, e.g., an integrated circuit with or without firmware. In addition, in some UEs, the functionality described for the processor 505 is split among two processors, a baseband processor and an applications processor. The exemplary embodiments may be implemented in any of these or other configurations of a UE.

The memory 510 may be a hardware component configured to store data related to operations performed by the UE 500. Specifically, the memory 510 may store data related to various applications. The display device 515 may be a hardware component configured to show data to a user while the I/O device 520 may be a hardware component that enables the user to enter inputs. It should be noted that the display device 515 and the I/O device 520 may be separate components or integrated together such as a touchscreen.

The transceiver 525 may be a hardware component configured to transmit and/or receive data. That is, the transceiver 525 may enable communication with other electronic devices directly or indirectly through a network based upon an operating frequency of the network. The transceiver 525 may operate on a variety of different frequencies or channels (e.g., set of consecutive frequencies) that are related to the VoLTE call functionality. Thus, an antenna (not shown) coupled with the transceiver 525 may enable the transceiver 525 to operate on the LTE frequency band.

It may be noted that the exemplary embodiments are described with reference to the LTE wireless communication system. However, those skilled in the art will understand that the exemplary embodiments may be applied to enhancing SMS over IP of a mobile device within any wireless communication schemes including those having different characteristics from the LTE scheme. For instance, the exemplary embodiments may be applied within any 3GPP network including LTE, Universal Mobile Telecommunications System ("UMTS"), etc. In other words, a network may indicate the SMS over IP capabilities to a UE through any number of methods, such as via a routing area update ("RAU") by a serving general packet radio service ("GPRS") support node ("SGSN") entity on the core network side (e.g., Node B in UTRAN).

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

The invention claimed is:

1. A method, comprising:
at a user equipment ("UE") connected to a network:
receiving an indicator value from the network corresponding to short message service ("SMS") capabilities of the network, wherein the indicator value identifies whether the network supports an SMS over Internet protocol ("IP") session;
when the indicator value identifies that the network supports the SMS over IP session, registering the UE for voice communication and the SMS over IP session with the network; and
when the indicator value identifies that the network does not support the SMS over IP session, registering the UE for voice communication without the SMS over IP session with the network.

2. The method of claim 1, wherein the network is a Long Term Evolution ("LTE") network and the voice communication is a Voice over LTE ("VoLTE") call.

3. The method of claim 1, wherein the registration includes registration with an IP multimedia subsystem ("IMS").

4. The method of claim 1, wherein the indicator value is an IMS over SMS indicator value.

5. The method of claim 1, wherein the indicator value is received from the network during at least one of an attach procedure, a tracking area update procedure or a routing area update procedure.

6. The method of claim 1, wherein the indicator value is based on subscription information from a Home Subscriber Server ("HSS") of the IMS.

7. The method of claim 1, wherein a component of the network determines whether the network supports an SMS over IP session based on at least one of a local policy, home public land mobile network ("HPLMN") capabilities, SMS over IP capabilities, UE capabilities, and coverage provided by Universal Terrestrial Radio Access Network ("UTRAN") and Evolved UTRAN ("E-UTRAN").

8. A user equipment ("UE"), comprising:
a transceiver configured to enable the UE to establish a connection to a network; and
a processor configured to:
receive an indicator value from the network, wherein the indicator value identifies whether the network supports a short message service ("SMS") over Internet protocol ("IP") session;
when the indicator value identifies that the network supports the SMS over IP session, register the UE for voice communication and the SMS over IP session with the network; and
when the indicator value identifies that the network does not support the SMS over IP session, register the UE for voice communication without the SMS over IP session with the network.

9. The UE of claim 8, wherein the network is a Long Term Evolution ("LTE") network and the voice communication is a Voice over LIE ("VoLTE") call.

10. The UE of claim 8, wherein the registration includes registration with an IP multimedia subsystem ("IMS").

11. The UE of claim 8, wherein the indicator value is an IMS over SMS indicator value.

12. The UE of claim 8, wherein the indicator value is received from the network during at least one of an attach procedure, a tracking area update procedure or a routing area update procedure.

13. The UE of claim 8, wherein the indicator value is based on subscription information from a Home Subscriber Server ("HSS") of the IMS.

14. The UE of claim 8, wherein a component of the network determines whether the network supports an SMS over IP session based on at least one of a local policy, home public land mobile network ("HPLMN") capabilities, SMS over IP capabilities, UE capabilities, and coverage provided by Universal Terrestrial Radio Access Network ("UTRAN") and Evolved UTRAN ("E-UTRAN").

15. A method, comprising:
at a component connected to a network:
identifying capabilities of the network;
setting an indicator value based on the capabilities of the network, wherein the indicator value indicates whether the network supports a short message service ("SMS") over Internet protocol ("IP") session; and
transmitting the indicator value to a user equipment ("UE").

16. The method of claim 15, wherein the network is a Long Term Evolution ("LTE") network and the voice communication is a Voice over LIE ("VoLTE") call.

17. The method of claim 15, wherein the indicator value includes an IP multimedia subsystem ("IMS") over SMS indicator value.

18. The method of claim 15, wherein the indicator value is transmitted by the component during at least one of an attach procedure and a tracking area update procedure.

19. The method of claim 15, wherein the network is one of a Long Term Evolution ("LTE") network or a Universal Mobile Telecommunications System ("UMTS") network.

20. The method of claim 15, wherein the component determines whether the network supports an SMS over IP session based on at least one of a local policy, home public land mobile network ("HPLMN") capabilities, SMS over IP capabilities, UE capabilities, and coverage provided by Universal Terrestrial Radio Access Network ("UTRAN") and Evolved UTRAN ("E-UTRAN").

\* \* \* \* \*